Patented Sept. 6, 1938

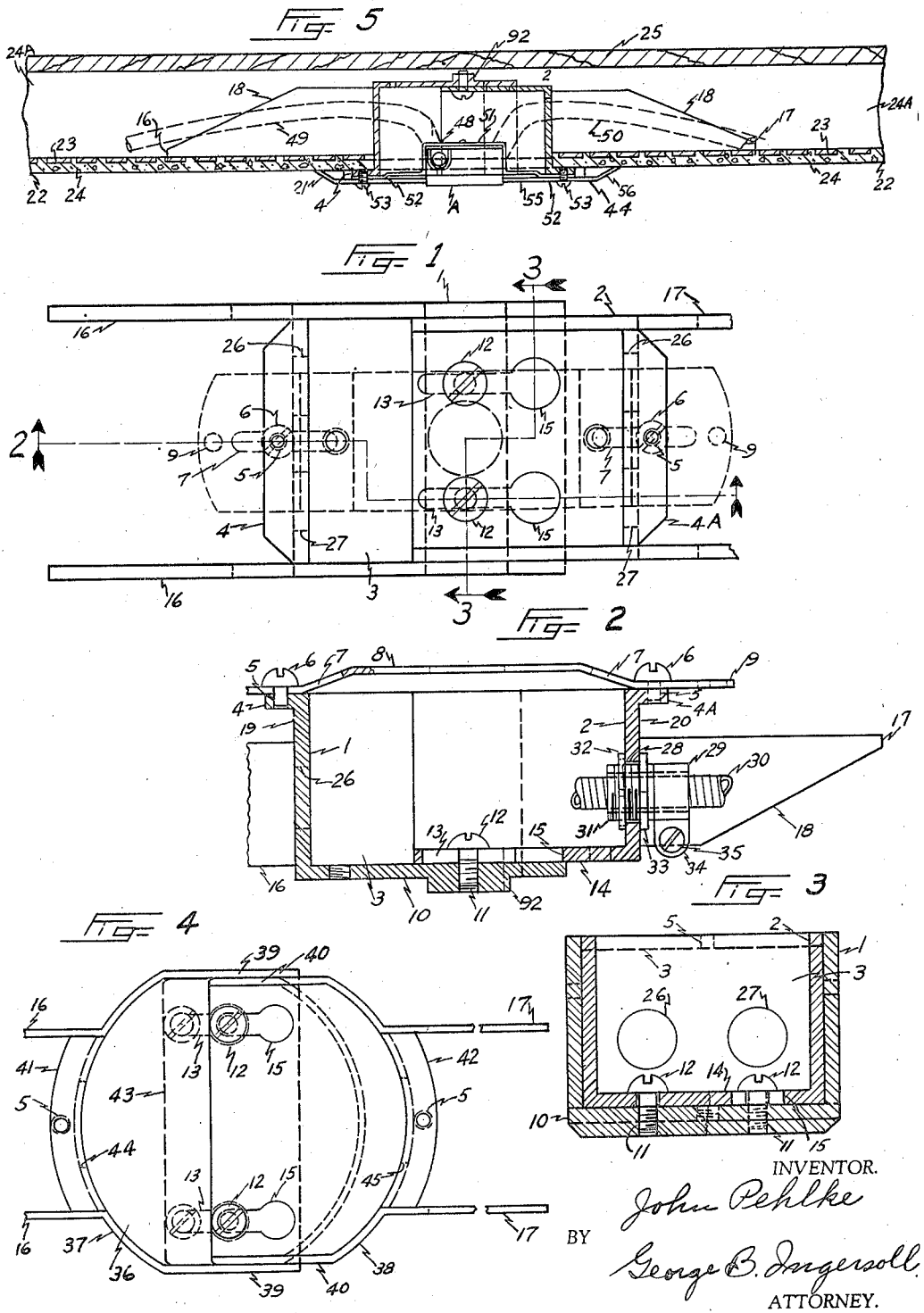

2,129,442

UNITED STATES PATENT OFFICE 2,129,442

JUNCTION BOX MECHANISM

John Pehlke, Detroit, Mich.

Application March 2, 1936, Serial No. 66,592

2 Claims. (Cl. 247—15)

My invention relates to improvements in junction box mechanisms adapted for installation in building structures and the objects of my improvements are, first, to provide a junction box mechanism adapted by its construction to retain itself in position in a building structure without the necessity of using auxiliary fastening means, such as screws, bolts or similar means, for engaging the building structure; second, to provide a junction box mechanism for mounting in an opening in a wall of a building structure and adapted to be adjusted to completely fill the opening, third, to provide a junction box mechanism that can be more quickly fitted to an opening in a wall portion of a building structure than has heretofore been possible; fourth, to provide a junction box mechanism adapted for use with base plugs, switches, fixture outlets or similar units; fifth, to provide a junction box mechanism that is especially adapted by its assembly with a wall portion of a building structure to support exceptionally heavy fixtures; sixth, to provide a junction box mechanism having a pair of housings telescopically mounted to a junction box; seventh, to provide a junction box mechanism with means for supporting fixtures from either its front or rear wall portions; eighth, to provide an adjustable junction box mechanism; ninth, to provide an adjustable junction box mechanism having openings for receiving cables therethrough with means for closing the holes to prevent the entrance of dust or similar foreign matter; tenth, to provide a junction box mechanism that is fireproof; eleventh, to provide an adjustable junction box mechanism adapted to permit the installation of a plurality of fixtures or outlet connector mechanisms therewith; twelfth, to provide a pair of housings adjustably connected by a housing member telescopically mounted therein; and thirteenth, to provide a junction box mechanism with notches or spaces adapted to engage and fit around the edge portions of an opening in a wall structure of a building or similar member.

I attain these objects by the mechanism illustrated in the accompanying drawing, in which:

Figure 1 is a plan view of the junction box mechanism provided with a connector plug mechanism; Fig. 2, a sectional view of the junction box mechanism taken on the line 2—2, Fig. 1; Fig. 3, a sectional view of the junction box mechanism taken on the line 3—3, Fig. 1; Fig. 4, a plan view of the junction box mechanism when constructed with substantially a cylindrical shape for use in a substantially cylindrical shaped opening; Fig. 5, a partial sectional view of a ceiling wall structure of a building together with a longitudinal sectional view of a junction box mechanism mounted therewith.

Similar numerals refer to similar parts throughout the several views.

The junction box mechanism as disclosed in Figs. 1, 2 and 3 comprises two housings 1 and 2 which telescopically engage one another to provide a chamber 3 having an open side, each of the housings 1 and 2 being respectively provided with the flanges 4 and 4A which are located adjacent the open side of the chamber 3, the flanges 4 and 4A each being provided with the threaded holes or openings 5 which are adapted to be engaged by the screws 6 which extend through the slots 7 in the bracket or plate 8, the slots 7 permitting the screws 6 to be assembled in adjusted positions relative to and to accommodate a longer length of the bracket or plate 8.

Also the bracket or plate 8 is provided with additional holes 9 at each of its ends for receiving the screws 6 therethrough when desired.

The bracket or plate 8 is thus adapted to support different types of light fixtures, said fixtures and said bracket or plate 8 being in turn supported from the flanges 4 and 4A of the housings 1 and 2.

It is to be noted that each of the housings 1 and 2 are provided with inner ends which are open, the housings 1 and 2 thus being adapted to telescopically slide one within the other to provide different sizes of chambers 3.

The inner wall portions 10 of the housings 1 are provided with the threaded holes 11 which are adapted to be engaged by the screws 12, the screws 12 extending through the slots 13 of the inner wall portion 14 of the housing 2, the slots 13 each being provided with an enlarged portion 15 which permits the head of the screws 12 to be initially inserted therethrough, after which the housing 2 may be slidably moved under the heads of the screws 12 so that the heads of the screws 12 will be located over the slots 13 to hold the inner wall portions 10 and 14 of the housings 1 and 2 together in fixed positions after the housings 1 and 2 have been telescopically adjusted to fit a selected opening, such as 21, in a wall structure such as hereinafter more fully described.

It is to be noted that the housings 1 and 2 are respectively provided with the flanges or arms 16 and 17, the flanges or arms 17 extending substantially parallel and at the sides of the housing 2, the flanges 16 extending substantially parallel at the sides of the housing 1.

The flanges 16 and 17 may be cut away at their inner corners by providing the angular surfaces 18 which will reduce weight and at the same time provide for requisite strength of the flanges 16 and 17.

It is now to be noted that there are notches or spaces 19 located between the inner or under surfaces of the flange 4 and the upper or outer edge surfaces of the flanges 16, and also the notches or spaces 20 will be located between the under or inner surfaces of the flange 4A and the upper or outer edge surfaces of the flange 17. The notches or spaces 19 and 20 are adapted to extend on adjacent sides of the lath and plaster structure 22 of a building in which an opening 21 has been provided for reception of the junction box mechanism.

Fig. 5 discloses a junction box mechanism installed in the opening 21 in the lath and plaster structure 22, the lath being indicated at 23 with the plaster formation 24 engaging the edge and outer surfaces of the laths 23.

The laths 23 are disclosed as being suitably secured to the rafters or studding 24A of the building structure, the rafters or studding 24A supporting the boards 25 which are adapted to form the floor of the space above the ceiling structure 22.

It is to be noted that the lath and plaster structure 22 will extend within the spaces 19 and 20 so that the outer surfaces of the flanges 16 and 17 will engage the inner surface of the lath and plaster structure 22 and thus support the junction box mechanism within the opening 21, the housings 1 and 2 being telescopically adjusted so that the end wall portions will tightly engage the end surfaces of the opening 21.

Also at the same time the flanges 4 and 4A will engage the outer or lower surface of the lath and plaster structure 22, the flanges 4 and 4A thus being located substantially flush or adjacent the outer surface of the lath and plaster structure 22 to retain the junction box mechanism from moving inwardly or outwardly of the opening 21, the end wall portions of the housings 1 and 2 engaging the end surfaces of the opening 21 to prevent the junction box mechanism from moving transversely within the opening 21, thus providing a secure mounting for retention of the junction box mechanism and at the same time allowing the junction box mechanism to be adjustably moved to completely fill the opening 21.

It is to be noted that the flanges 16 and 17 will be provided with sufficient lengths so that their edge portions which engage the inner surfaces of the lath and plaster structure 22 will provide an extensive area for resting on the inner surface of the lath and plaster structure 22, thus providing for supporting the weight of any fixture which may be secured to the junction box mechanism, over a substantial area of the lath and plaster structure 22.

The end wall portions of the chamber 3 of the junction box mechanism are conventional provided with knockout portions 26 and 27, the knock-out portions 26 and 27 being disclosed as plug members which tightly engage and fit within the openings on the side wall portions of the housing 1 and 2, thus permitting said knock-out portions 26 and 27 to be punched out as required to leave the necessary and selected openings for the insertion of cable or wire members therein.

Fig. 2 discloses one of the knock-out portions 26 as having been punched out of the side wall of the housing 2 to provide an opening 28 in which is assembled a conventional connector or clamp member 29 for supporting the flexible cable 30, the clamp member 29 being provided with the threaded end 31 which extends through the opening 28, the threaded end 21 being engaged and retained by the nut 32 which is adapted to pull the clamp 29 through the opening 20 so that the flange 33 of the clamp 29 tightly engages the outer surface side of the end wall portion of the housing 2.

The clamp 29 is provided with clamp portions 34 which are adapted to be clamped together by the screws 35 which thus clamp the flexible cable 30 in a secured position relative to the clamp 29 and the end wall portion of the housing 2.

It is to be noted that the chamber 3 formed by the housings 1 and 2 will be practically closed except for the openings in its end wall portions which have been formed by punching out the knock-out portions 26 or 27, the lower wall portion 19 of the housing 1 extending past the ends of the slots 13 together with its enlarged openings 15 to close said slots and openings and to provide a closed inner wall structure for the chamber 3.

It is to be noted that my junction box mechanism thus eliminates the necessity of securing it by screws or other similar fastening means or gadgets to the lath and plaster structure 22, the construction of the junction box mechanism, as described relative to the notches or spaces 19 and 20, together with the flanges 4, 4A, 16 and 17, permitting the junction box mechanism to be securely mounted and retained in the opening 21 and relative to the lath and plaster structure 22 without the necessity of conventional fastening means such as screws, etc., the formation of the mechanism thus depending for its rigidity and supporting strength on its own inherent construction and its assembly in engagement with the lath and plaster structure 22.

It is to be noted also that my junction box mechanism can be used in a great number of various installations for base plugs, electrical switches, light fixtures, and for practically any kind of a fixture requiring a junction box or outlet mechanism.

Also the junction box mechanism can be installed in a considerably less time than conventional units used heretofore and due to its inherent construction of being supported over a considerable area of a lath or plaster construction 22, will be capable of permanently supporting excessive loads without dislocation or injury to the lath or plaster structure 22.

It is to be noted also that when a light or similar fixture is mounted on the junction box mechanism, or in conjunction with other closure means, the junction box mechanism will provide a chamber 3 that will allow a minimum amount of air circulation therethrough and thus provide for exclusion of practically all dirt or foreign matter such as would accummulate in a conventional junction box mechanism over a period of time when installed in building structures.

It is also to be noted that my junction box mechanism may be constructed with a rectangular chamber 3 as disclosed in Figs. 1, 2, 3, and 5, or it may be constructed to provide an oval or substantially cylindrical chamber 36 as disclosed by the construction in Fig. 4, the housings 37 and 38 being herein disclosed with end wall portions of oval or substantially cylindrical shape having the side wall portions 39 and 40 for telescopically engaging one another to form the chamber 36.

The housings 37 and 38 will be provided with the flanges 16 and 17 which are similar to those disclosed in Figs. 1, 2, 3 and 5.

Also the housings 37 and 38 will be secured together by the screws 12 in a similar way to that described relative to the junction box mechanism in Figs. 1, 2, 3, and 5.

The housings 37 and 38 will be provided with the flanges 41 and 42 which are similar to the flanges 3 and 4 of Figs. 1, 2, 3 and 4, with the exception that they are oval or semi-cylindrical in shape to conform to the oval or substantially cylindrical shape of the housings 37 and 38.

Fig. 5 further discloses the connector plug assembly A assembled and supported in the junction box mechanism.

The connector assembly A is provided with the bracket 51 which is suitably secured to the connector assembly A, the bracket 51 being provided with the arms or flanges 52 which are adapted to engage with the outer surfaces of the flanges 4 and 4A of the housings 1 and 2 and to be secured thereto by the screws 53 which extend through suitable openings 54 in the arms or flanges 52.

Also the screws 53 pass through suitable openings in the trim plate 55 which is adapted to extend snugly around the connector assembly A, the plate 55 being provided with the angular portion 56 extending around its periphery and engaging the outer surface of the lath and wall structure 22, the plate 55 thus providing a conventional trim plate or member through which is exposed the connector assembly A for receiving the conventional plug in assembly therewith for connecting a desired electric unit with the cables 49 and 50.

It is to be noted that the housings 1 and 2 may be constructed of relatively thin material which will enable them to be formed as by stamping, as integral units, or they may be constructed by welding the various portions of the housings together, or the housings may be made of cast material to provide the requisite strength of the various joints.

In operation, the opening 21 is formed in the lath and plaster structure 22 of the ceiling or side wall portion of a room as desired, or if an opening 21 is already provided in the said lath and plaster structure 22, then the housing 1, together with the screws 12 mounted therein, is inserted into and through the opening 21, the flanges 16 being inserted through the opening 21 so that they will extend adjacent and engage the inside surface of the lath and plaster structure 22 and at the same time the flange 4 will extend adjacent and engage the outside surface of the lath and plaster structure 22, the edge portion of the lath and plaster structure 22 adjacent the openings 21 thus closely fitting within the notch or space 19.

After the housing 1 has thus been inserted within and through the opening 21, the electrical cable or cables 49 will be inserted and pulled through the openings 26 so that the terminal ends will be available for connection to the fixtures to be mounted in conjunction with the junction box mechanism.

After the housing 1 has been thus assembled, the housing 2 will be inserted within and through the opening 21, the flanges 17 being extended so that the flanges 17 will engage the inner surface of the lath and plaster structure 22 while the flange 4A of the housing 2 will extend adjacent and engage the outside surface of the lath and plaster structure 22.

The housing 2 will now be telescopically mounted within the housing 1, the enlarged portions 15 of the slots 13 allowing the heads of the screws 12 to be inserted therethrough, this further permitting the inner wall portion of the housing 2 to be moved under the heads of the screws 12. The housings 1 and 2 now may be telescopically moved so that their end portions tightly engage and fit with the edge portions of the ends of the opening 21.

After the housings 1 and 2 have been thus adjusted to tightly fit the opening 21, the screws 12 may be tightened down to rigidly retain the housings 1 and 2 in their assembled positions to form the chamber 3.

The electric cables 18 are threaded through the necessary number of openings 28 in the housing 2 to permit the cables 49 and 50 to extend within the chamber 3 for connection with the fixtures or units which the junction box mechanism is to support and be in connection with.

I claim:

1. In a junction box mechanism for electric cables connected with an electric fixture and adapted to adjustably fit an opening in a wall structure of a building, the combination of a pair of housings telescopically mounted one within the other to form a chamber having an open side, each of said pair of housings being provided with a pair of flanges adapted to be extended through said opening of said wall structure and to engage an inner surface of said wall structure, said pair of flanges extending longitudinally in planes extending parallel with the side walls of said pair of housings, each of said pair of housings being provided with a third flange adjacent the open side of said chamber and adapted to engage an outer surface of said wall structure, edge surfaces of said pair of flanges and a side surface of said third flange of each of said pair of housings forming a notch or space therebetween for closely fitting an edge portion of said opening of said wall structure, said pair of housings being provided with openings to permit said electric cables to extend into said chamber formed by said housing and to connect with said fixture, and means for securing said housings together.

2. In a junction box mechanism for an opening in a wall structure, a pair of housings telescopically mounted and each provided with an open front side oppositely disposed to a closed rear side together with closed end and side walls, each of said housings being provided with a pair of flanges formed integrally with and extending from said closed ends thereof, said pair of flanges extending substantially parallel with one another and with said closed side walls, said pair of flanges extending within the interior of and engaging an inner surface of said wall structure, each of said pair of housings being further provided with a flange formed integrally with and extending from said closed ends, said last mentioned flanges engaging an outside surface of said wall structure, said last mentioned flanges and said pairs of flanges forming notches for receiving a side of said wall structure therein.

JOHN PEHLKE.